United States Patent
Latenstein Van Voorst et al.

(10) Patent No.: US 8,082,813 B2
(45) Date of Patent: Dec. 27, 2011

(54) ACTUATOR FOR DISPLACEMENT OF A HOLDER AGAINST A HOMING-POSITION

(75) Inventors: Andre Latenstein Van Voorst, Eindhoven (NL); Libert Henricus Augustinus Maria Camps, Tessenderlo (BE); Johannes Antonius Van Rooij, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 421 days.

(21) Appl. No.: 12/373,094

(22) PCT Filed: Jul. 10, 2007

(86) PCT No.: PCT/IB2007/052743
§ 371 (c)(1),
(2), (4) Date: Jan. 9, 2009

(87) PCT Pub. No.: WO2008/010151
PCT Pub. Date: Jan. 24, 2008

(65) Prior Publication Data
US 2009/0288510 A1  Nov. 26, 2009

(51) Int. Cl.
*F16H 3/06* (2006.01)
*F16H 27/02* (2006.01)
*F16H 29/02* (2006.01)
*F16H 29/20* (2006.01)

(52) U.S. Cl. ............................ 74/89.37; 74/89.23
(58) Field of Classification Search ............... 74/89.37, 74/89.23
See application file for complete search history.

(56) References Cited

U.S. PATENT DOCUMENTS

| | | | | | |
|---|---|---|---|---|---|
| 2,356,861 | A | * | 8/1944 | Link | 74/89.37 |
| 2,715,341 | A | * | 8/1955 | Hogan | 74/89.37 |
| 2,944,437 | A | * | 7/1960 | Pickles | 74/89.37 |
| 3,029,660 | A | * | 4/1962 | Sears | 74/89.37 |
| 3,416,386 | A | * | 12/1968 | Pickles | 74/89.37 |
| 5,214,970 | A | * | 6/1993 | Vezain | 74/18.1 |
| 5,255,882 | A | | 10/1993 | Schroppel | |
| 5,461,935 | A | | 10/1995 | Hill | |
| 6,282,380 | B1 | | 8/2001 | Yamamoto | |
| 6,546,825 | B1 | | 4/2003 | Kugle | |
| 2005/0157608 | A1 | | 7/2005 | Nagatsuka | |
| 2005/0252318 | A1 | | 11/2005 | Corney | |

FOREIGN PATENT DOCUMENTS

| | | |
|---|---|---|
| JP | 58178046 A | 10/1983 |
| JP | 2004272945 A | 9/2004 |
| WO | 2006038483 A1 | 4/2006 |

* cited by examiner

*Primary Examiner* — Justin Krause

(57) ABSTRACT

A lead screw actuator for displacing holder with a collimator lens in an optical scanning device has a home-position for accurately determining the position of the collimator lens. An anti-seize construction is provided to avoid the holder to get stuck against the home-position due to the friction between both surfaces.

17 Claims, 3 Drawing Sheets

ACTUATOR FOR DISPLACEMENT OF A HOLDER AGAINST A HOMING-POSITION

FIELD OF THE INVENTION

The present invention relates to an actuator for displacement a holder along a displacement axis against a homing-position. The invention also relates to an optical scanning device using such an actuator for displacement of an optical element mounted in the holder.

BACKGROUND OF THE INVENTION

The manufacturing process causes optical data carriers to have a substrate thickness that locally or globally deviates from the standard thicknesses as prescribed for example in standards for DVD or Blu-ray Disc (BD) optical data carriers. As the objective lens of the optical scanning device is designed for a specific substrate thickness, such deviations introduce spherical aberration in the scanning radiation beam of the optical scanning device when scanning such optical data carriers. The spherical aberration caused by a thickness error is particularly large in BD optical scanning devices because of the high numerical aperture (i.e. 0.85) of the objective lens. In multi-layer BD optical data carriers, e.g. dual-layer BD, a spacer layer separates the information layers on which data is to be recorded or scanned from. Such a spacer layer thickness may cause an additional error in the total thickness to be scanned through. Moreover, even when the manufacturing tolerances of the substrate thickness were very small, the fixed correction provided for in the objective lens would not suit the total thickness of each layer of a dual-layer BD disc. Hence accurate spherical aberration correction is required in order to read and/or write on such a BD disc, especially a multi-layer disc, with sufficient read and or write performance, for example, low jitter.

A known solution of correcting spherical aberration introduced in the scanning beam is a vergence change of the radiation beam towards to objective lens, e.g. by making a parallel radiation beam slightly converging or diverging depending on the sign of the thickness error. Such a change of vergence can be achieved by, for example, the moving-collimator-method: a controlled displacement of a collimator lens in radiation beam towards the objective lens introduces spherical aberration into the scanning beam in order to compensate the spherical aberration introduced by a substrate thickness error or by scanning an information layer at different depth in the optical data carrier than the objective lens was designed for. In order to correct the spherical aberration the actual position of the lens is preferably to be known.

JP2004-272945 discloses an actuator for displacing a collimator lens. The actuator comprises a motor driving a lead screw cooperating with a follower attached to a guided lens holder. The application discloses one or more specific configurations for avoiding errors in positioning when the displacement of the lens holder is reversed in direction.

At startup of for example a BD scanning system applying such a moving collimator, the collimator lens position can be unknown. For this, the collimator lens is displaced to a known location, e.g. a home-position or a stopping-position, at startup. A known solution to detect the home-position is by means of a light-interrupter.

Another method is to move the collimator lens to the home-position with an excessive number of steps of a lead-screw driven by a stepper motor. The collimator lens or holder with collimator lens will hit the home-position, stopping the displacement. A follower nut is attached to the collimator lens or lensholder. The follower nut is cooperating with the lead-screw that is to be driven by the motor. A reference-surface is provided to, for example, the lens holder or follower nut to come into contact with the home-position, thereby determining the position of the collimator lens.

A problem encountered with this method is that when the collimator lens is moved to the home-position the reference-surface can get stuck at this home-position. This is caused by a combination of the composition of the mechanical tolerances, friction variations and friction vectors between the lead-screw, follower nut, motor and home-position. The motor torque required for releasing the collimator lens from the home-position is larger than the torque required for homing. Depending on the available power the motor can apply the reference-surface may remain stuck against the home-position. This may especially occur, when in view of requirement such as, for example, low power consumption and miniaturization the motor has to be small and low power.

In order to avoid the reference-surface to get stuck to the home-position a large pitch of the thread of the lead-screw can be applied, however, this will result in inaccurate position-control of the collimator lens and thus inaccurate control of the spherical aberration correction.

It is an object of the invention to provide an improved actuator for displacement of a holder in which it is avoided that the reference-surface gets stuck against the stopping-surface of the home-position.

SUMMARY OF THE INVENTION

In accordance with the present invention, there is provided an actuator for displacement of a holder along a displacement axis, comprising a motor for driving a lead screw, the lead screw having a thread with a pitch and a pitch angle, the holder having a thread arranged to cooperate with the lead screw for the displacements of the holder, the holder having a reference-surface, a home-position having a stopping-surface for stopping the displacement of the holder when the reference-surface of the holder contacts the stopping-surface, wherein at least one of said stopping-surface and reference-surface is making a sharp angle with a plane perpendicular to the displacement axis of the holder and having a same direction as the pitch angle of the lead screw.

By applying a sharp angle to at least on of the stopping-surface and reference-surface with a plane perpendicular to the direction of displacement and giving this slant angle a same orientation as the pitch angle of the lead screw, the combined effect of both angles will reduce the friction forces between the reference-surface and stopping-surface. This allows for easier release of the holder from the home-position. The thread may be integrated with the holder, but also on a separate element attached to the holder.

In a preferred embodiment according to the invention the sharp angle of the at least one of said stopping-surface and reference-surface is larger than the pitch angle of the lead screw.

The lead-screw pitch and pitch angle can remain low to allow for accurate control of the displacement of the holder as is preferred for accurate spherical aberration correction. The effect of friction reduction is than mainly determined by the sharp angle of at least one of said stopping-surface and reference-surface.

Preferably both the stopping-surface and reference-surface are substantially parallel and making a sharp angle with a plane perpendicular to the displacement axis of the holder, as this will enhance the effect of friction reduction.

In another preferred embodiment the stopping-surface and/or the reference-surface is helical-shaped.

If one of the stopping-surface or reference-surface, and preferably both has or have an helical shaped surface it better matches a possible slight rotation of the holder due to a torque applied by the rotating lead-screw and mechanical tolerances in the actuator. The friction will thus be reduced.

In a further embodiment according to the invention, both the stopping-surface and reference-surface are substantially parallel and make a sharp angle with a plane perpendicular to the displacement axis of the holder.

When both surfaces are parallel to each other the forces per unit area are reduce which is advantageous with respect to a lower wear of the surfaces during lifetime of the device.

Preferably, the stopping-surface and/or the reference-surface is/are helical-shaped.

When both surfaces are helical-shaped, the surfaces may release even better as due to mechanical tolerances a slight rotation of the holder has a contributing effect to the release of the surfaces.

In a further embodiment of the invention, the reference-surface and the stopping-surface having a friction coefficient, the lead-screw having a pitch with a pitch angle, the actuator further characterized in that the sum of the pitch angle, the sharp angle of the reference-surface or the stopping-surface is equal or larger than the friction coefficient between the reference-surface and stopping-surface.

By applying a sum of angles equal or larger than the friction coefficient between the contacting surfaces of the reference-surface and the stopping-surface a full anti-seize construction is established. No additional forces are required to release the surfaces from each other.

In a further preferred embodiment of an actuator according to the invention the reference-surface and the stopping-surface are substantially parallel and have a friction coefficient and the sum of the pitch angle of the lead screw, the sharp angle of both the reference-surface and the stopping-surface is equal or larger than the friction coefficient between the reference-surface and stopping-surface.

This embodiment allows for an anti-size construction between the reference- and stopping-surface, avoiding the holder to get stuck at the home-position. When removing from the home-position an applied force along the interface between the stopping- and reference-surface will then be equal or larger than the friction force and thus creating an anti-seize effect.

The actuator according to the invention may apply a stepper motor, which makes accurate displacements of the holder possible.

The holder in the actuator according to the invention may comprise an optical element, e.g. a lens, for changing the optical characteristic of the optical device that holds such an actuator. In an optical scanning device for scanning an optical data carrier such a lens can be a collimator lens to be used for example to change the vergence of the radiation beam toward the objective lens. In an optical imaging device, such a camera, the lens may be applied for changing focus or zoom characteristics of the optical imaging device.

Further features and advantages of the invention will become apparent from the following description of preferred embodiments of the invention, given by way of example only, which is made with reference to the accompanying drawings.

DETAILED DESCRIPTION OF THE INVENTION

Figure 1:
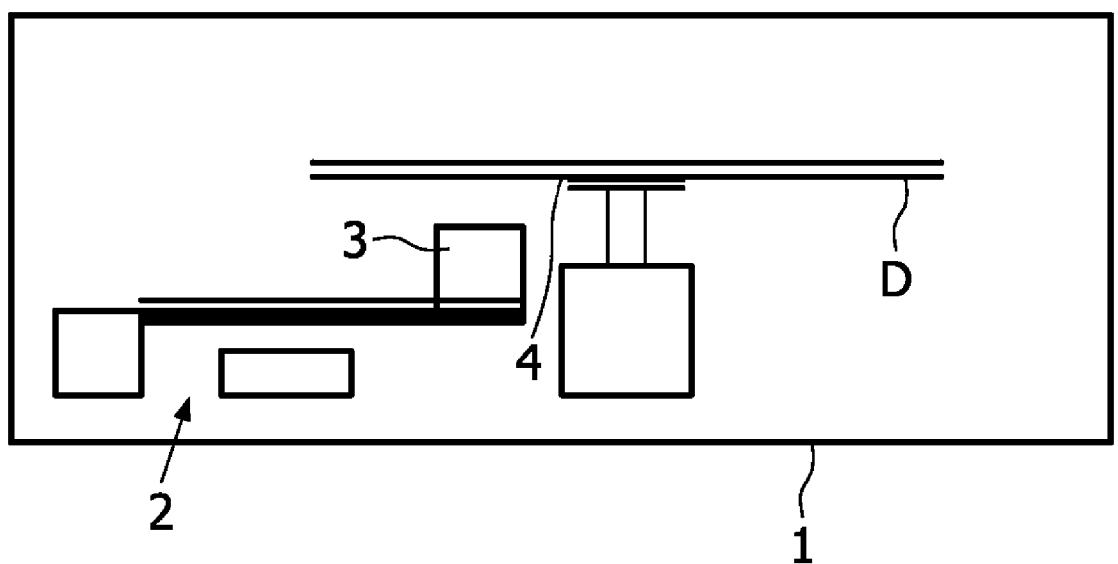
FIG. 1 is a very schematic cross-section of a disk drive unit according to the invention.

FIG. 1 shows a schematic optical data drive that may be used for scanning, such as reading and/or writing, information from and/or to an information layer of an optical data carrier. The optical data carrier may be, for example, a DVD or a BD. The device in which this optical data drive is used may be a portable or a stationary device, such as an audio or video player and/or recorder or a data disk reader and/or writer.

The optical data drive may include a housing 1 accommodating the optical data drive. The optical data drive comprises an optical scanning device 2 including an objective lens actuator 3 and a driven turntable 4 for supporting and rotating a disk D.

Figure 2:
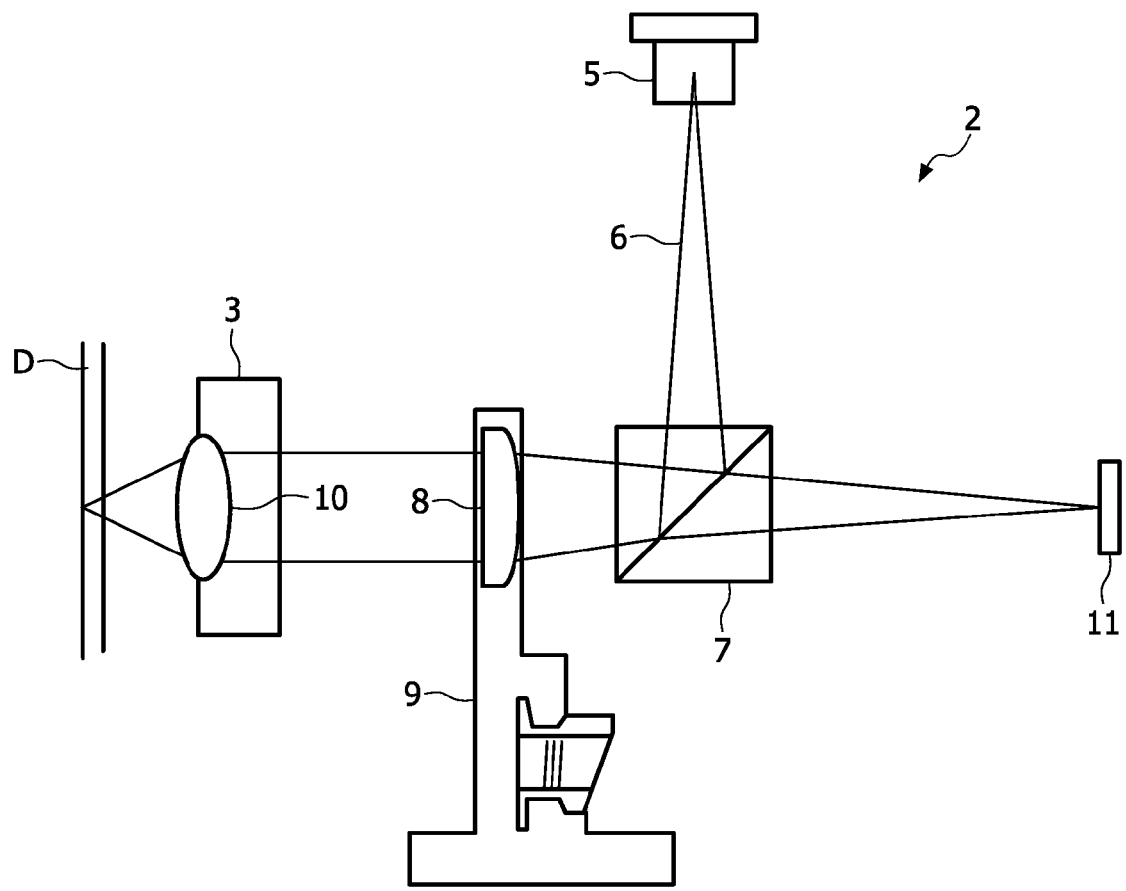
FIG. 2 is a larger scale schematic plan view of a portion of the optical system in the device of FIG. 1.

FIG. 2 schematically shows a part of the optical scanning device 2 in some more detail. Depicted are the objective lens actuator 3 and a light source 5, for example a semi-conductor laser, for reading and/or writing information on the optical data carrier, e.g. a disc D. The radiation beam 6 emitted by the light source 5 may be reflected by a beamsplitter 7 towards the objective lens actuator. The beamsplitter may be for example a prism type (as shown in the figure) or plate type beamsplitter. A collimator lens 8 transforms the divergent emitted radiation beam 6 into a substantially parallel radiation beam. The objective lens 10 in the objective lens actuator 3 focuses the parallel radiation beam onto an information layer of disk D. Disk D may include several layers on which information can be recorded or from which information can be read, for example, a dual-layer DVD or multilayer BD.

The radiation reflected from the disc is transmitted back into the objective lens and directed via the collimator lens towards a radiation detection system 11 used, for example, for data-signal and/or tracking signal generation.

The light path between the laser source 5 and the disc D as well as disc and radiation detection system is determined by the optical data drive and optical design requirements of the optical scanning device 2 and may comprise a plurality of mirrors and lenses. Depending on the type of optical scanning device, the device may also comprise additional radiation sources, such as for example for scanning a DVD disc and/or a CD disc.

The collimator lens is mounted in a movable holder 9 in order to change the vergence of the radiation beam towards the objective lens.

Figure 3:
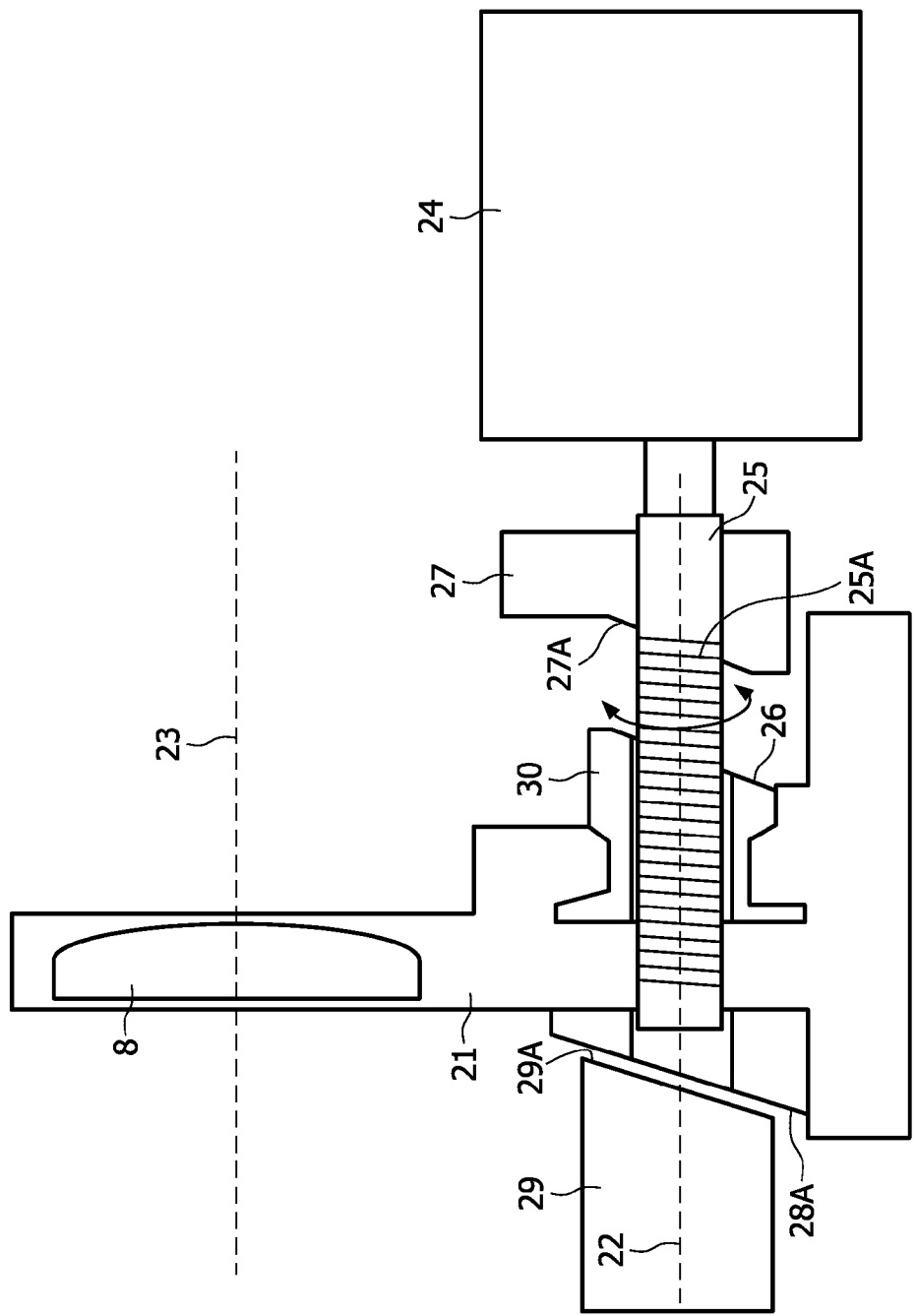
FIG. 3 is a schematic plan of an example of a movable holder, stopping- and reference-surface according to the invention.

In FIG. 3 an example of a movable holder 21 for displacing a collimator lens 8 and its driving means or actuator for displacement are schematically shown. A driving means displaces the collimator lens 8 in the holder 21 along a displacement axis 22 which preferably is oriented parallel to the optical axis 23 of the collimator lens in order to avoid the introduction of optical aberrations in the radiation beam towards the objective lens. A motor 24 is applied for driving a lead screw 25 with a thread 25A. The lead screw is arranged to cooperate with a thread in or on the holder. When the lead screw is driven, e.g. rotated by the motor, the holder 21 will be displaced along the displacement axis 22. The lead screw preferably has a high pitch in order to be able to make an accurate displacement of collimator lens possible. The holder 21 has a tread to cooperate with the lead screw. The thread of the holder may also be present in a separate follower nut 30 mounted to the holder. Preferably, the lead screw is suspended such that it has a minor degree of freedom in rotation.

During homing, the lead screw rotates, creating a translation of the holder in the direction of the home-position. The home-position 27 has a stopping-surface 27A for stopping the displacement of the holder. This home-position may, for example, be integrated in the housing of the optical scanning device or as separate component mounted to the optical scanning device, or integrated in the driving means 24. The housing of the optical scanning device may be for example made of a plastic, or a metal such as aluminum, or a moldable metal mixture such as ZAMAC™. The holder and/or follower nut may also be made of such materials.

When the reference-surface 26 of the holder touches the stopping-surface 27A of the home-position, the force in axial direction increase dramatically. This force will stop the movement of the holder as well as the rotation of the lead screw as intended, resulting in an accurate stop. The reference-surface 26 may, for example, be on the holder 21 or the follower nut 30.

The stopping-surface 27A is preferably making a sharp angle $\alpha_S$ with a plane perpendicular to the displacement axis 22 of the holder. Preferably, the sharp angle of the stopping-surface has the same direction as the angle $\alpha_P$ of the pitch of the lead screw 25. The holder 9 may also have a reference-surface 26 that is making a sharp angle $\alpha_R$ with a plane perpendicular to the displacement axis 22 of the holder. Preferably, the reference-surface 26 and the stopping-surface 27A have surfaces that are substantially parallel to each other, because this may improve the reduction of the friction and reduces the risk of wear. More preferably these surfaces are symmetrically arranged around the displacement axis of the holder, e.g. around the lead screw. When homing the forces between the stopping- and reference-surface are symmetrically generated due to which no radial displacement or tilt of the holder is introduced.

Because the contact surfaces 27A and 26 of the home-position and the holder are making an angle in the same direction as the pitch of the lead screw an anti-seize construction is established. When only one of the stopping- or reference surface is making a sharp angle and the other one is e.g. perpendicular to the displacement axis 22 of the holder, the sum of the angles $\alpha_P$ and $\alpha_S$ or $\alpha_R$ is to be equal or larger than the friction coefficient the sum of the angles $\alpha_P$, $\alpha_S$ and $\alpha_R$ is equal to or larger than the friction coefficient 'f' between the materials of the reference-surface 26 and stopping-surface 27A. When both stopping- and reference-surface are substantially parallel ($\alpha_S=\alpha_R$) the sum the angles $\alpha_P$ and $\alpha_S$ is to be equal to or larger than the friction coefficient 'f' to obtain an anti-seize construction, such that there is substantially no force required for releasing the holder from its home-position. If the stopping- and reference-surface are making different sharp angles ($\alpha_S \neq \alpha_R$) with the displacement axis 22 of the holder, preferably the sum of the angle $\alpha_P$ and the largest of the angles $\alpha_S$ and $\alpha_R$ is to be equal to or larger than the friction coefficient 'f' to obtain the desired anti-seize construction.

Preferably, both reference- and stopping-surface are helically shaped. The axial force during homing is then translated into a rotational force between both surfaces. When the holder or the follower nut is suspended such that it has, preferably, a minor freedom to rotate around the lead screw axis, it will prevent the axial force to build up and lock the rotation of the lead screw in reverse. If the sum of the pitch and surface angles is equal or larger than the friction coefficient, zero force will build up.

In an example according to the invention, the stopping-surface is on e.g. a holder made of a low friction coefficient material and the reference-surface is on a component or part made of Zamac ZAMAC™ (a zinc-aluminum alloy). Examples of such low friction coefficient materials are TEFLON™ or VECTRA™ A430 (a plastic filled with TEFLON™). This results in a friction coefficient between the two surfaces of about 0.2 (or about 11 degrees) depending on the specific ZAMAC™ alloy. This value may depend on the surface structure, but in this example it concerns smooth molded surfaces. Both surfaces, which may be helical shaped, are making an angle ($\alpha_H$, $\alpha_R$) of 4 degrees with the plane perpendicular to the displacement axis. The lead screw has a pitch of 1.5 mm and a pitch angle ($\alpha_p$) of 9 degrees in the same direction as the stopping- and reference-surfaces. The sum of the angles is larger than the friction coefficient between both surfaces. Thus, substantially no (rotational) force is required to release the holder from its home-position. In order to avoid displacements of the holder in directions other than the axial direction it is preferred that the contacting surfaces are located symmetrically around the lead screw, e.g. circular contacting surface or segments around the lead screw. In this way the resulting force is applied along or at the displacement axis and substantially no axial displacement or tilting of the holder occurs.

The materials of the stopping-surface and reference-surface may be different, e.g. an aluminum or plastic molded optical scanning device with integrated stopping-surface and a plastic holder. Preferably, the materials of reference- and stopping-surface are chosen such that the resulting friction coefficient is low. This avoids steep angles for the reference- and stopping-surface, which requires e.g. more space.

The contact surfaces 26 and 27A may extend all around the lead screw as circular or elliptical surfaces, but may also be, for example, portions or segments of ring-shaped surfaces having the characteristics according to the invention, i.e. at least one of the stopping-surface and reference-surface is making a sharp angle with a plane perpendicular to the displacement axis of the holder and having the same direction as the pitch angle of the lead screw.

A similar construction may be applied to the end-position at the other end of the lead screw. During operation of the optical scanning device the back side of the holder 21 may in some situations be positioned to the end of the displaceable range and may thus also lock against the end-position. An anti-seize construction as described in relation to the stopping-surface of the home-position may therefore also be applied to the end-position 29 with a tilted end-stopping-surface 29A and an end-reference-surface 28A of the holder. The home-position as referred to in the above description may therefore also be considered to be an end-position which has or has not a function related to the determination of the holder position. Therefore one of or both the home-position and end-position may be constructed according to the invention.

The above described displacement of the holder 21 is described as an example and may also be arranged differently, for example, a tooth-rack on the holder driven by a motor with a gear-wheel.

The motor preferably is a stepper motor, which can be used for accurate determination of the number of rotations or part of a rotation of the lead-screw.

Then invention is described in relation to a collimator lens to be displaced for spherical aberration correction in an optical scanning device. However, the invention can be applied in many other applications in which a displaceable holder, comprising e.g. an optical or mechanical element, may run against an end-stop. One such application is an imaging device such as a photo-camera with a displaceable lens in order to facilitate a zoom-function.

While the invention has been illustrated and described in detail in the drawings and foregoing description, such illustration and description are to be considered illustrative or exemplary and not restrictive; the invention is not limited to the disclosed embodiments. Furthermore, equivalents and modifications not described above may also be employed without departing from the scope of the invention, which is defined in the accompanying claims. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An actuator for displacement of a holder along a displacement axis comprising:
   a driver for driving a lead screw;
   the lead screw having a screw thread with a pitch and a pitch angle;
   the holder having a holder thread arranged to cooperate with the screw thread for the displacements of the holder, the holder having a reference-surface; and
   a home-position device having a stopping-surface for stopping the displacement of the holder when the reference-surface of the holder contacts the stopping-surface,
   wherein the stopping-surface and the reference-surface form an acute angle greater than zero with a plane perpendicular to the displacement axis of the holder and have a same direction as the pitch angle of the lead screw, and
   wherein the acute angle of the at least one of the stopping-surface and the reference-surface is larger than the pitch angle of the screw thread.

2. The actuator according to claim 1, wherein both the stopping-surface and the reference-surface are substantially parallel.

3. The actuator according to claim 1, wherein the stopping-surface and/or the reference-surface is helical-shaped.

4. The actuator according to claim 1, the reference-surface and the stopping-surface having a friction coefficient, wherein a sum of the pitch angle of the screw thread and a largest of the acute angle of the reference-surface and the acute angle of the stopping-surface is equal or larger than the friction coefficient between the reference-surface and the stopping-surface.

5. The actuator according to claim 1, wherein the driver comprises a stepper motor.

6. The actuator according to claim 1, wherein an optical element is mounted to the holder.

7. The actuator according to claim 6, wherein the optical element is a collimator lens.

8. An optical scanning device comprising the actuator according to claim 1.

9. The optical scanning device according to claim 8, the optical scanning device having a housing, wherein the stopping-surface is integrated in the housing.

10. An optical imaging device comprising the actuator according to claim 1.

11. The actuator of claim 1, wherein both the stopping-surface and reference-surface are substantially parallel and have a constant slope.

12. The actuator of claim 1, wherein the stopping-surface is between perpendicular portions of the home-position device that are perpendicular to the displacement axis.

13. The actuator of claim 12, wherein the stopping-surface extends beyond the lead screw and the perpendicular portions begin at a distance from the lead screw.

14. An actuator for displacement of a holder along a displacement axis comprising:
   a driver for driving a lead screw;
   the lead screw having a screw thread with a pitch and a pitch angle;
   the holder having a holder thread arranged to cooperate with the screw thread for the displacements of the holder, the holder having a reference-surface; and
   a home-position device having a stopping-surface for stopping the displacement of the holder when the reference-surface of the holder contacts the stopping-surface,
   wherein the stopping-surface and the reference-surface form an acute angle greater than zero with a plane perpendicular to the displacement axis of the holder and have a same direction as the pitch angle of the screw thread, and
   wherein both the stopping-surface and reference-surface are substantially parallel and have a constant slope.

15. The actuator of claim 14, wherein the stopping-surface is between perpendicular portions of the home-position device that are perpendicular to the displacement axis.

16. The actuator of claim 15, wherein the stopping-surface extends beyond the lead screw and the perpendicular portions begin at a distance from the lead screw.

17. The actuator of claim 14, the reference-surface and the stopping-surface having a friction coefficient, wherein a sum of the pitch angle of the screw thread and a largest of the acute angle of the reference-surface and the acute angle of the stopping-surface is equal or larger than the friction coefficient between the reference-surface and the stopping-surface.

* * * * *